(12) United States Patent
Lefebure

(10) Patent No.: US 6,824,377 B2
(45) Date of Patent: Nov. 30, 2004

(54) BLOW STATION BOTTOM PLUG ACTUATING MECHANISM

(75) Inventor: Brian R. Lefebure, Lee's Summit, MO (US)

(73) Assignee: R&D Tool & Engineering Co., Lee's Summit, MO (US)

( * ) Notice: Subject to any disclaimer, the term of this patent is extended or adjusted under 35 U.S.C. 154(b) by 22 days.

(21) Appl. No.: 10/360,399

(22) Filed: Feb. 7, 2003

(65) Prior Publication Data

US 2004/0156943 A1 Aug. 12, 2004

(51) Int. Cl.[7] .......................... B29C 49/54; B29C 49/56
(52) U.S. Cl. ................ 425/541; 425/522; 425/DIG. 5; 425/DIG. 58
(58) Field of Search ................ 425/522, 541, 425/DIG. 5, DIG. 58

(56) References Cited

U.S. PATENT DOCUMENTS

| | | | | |
|---|---|---|---|---|
| 2,974,362 A | * | 3/1961 | Knowles | 425/541 |
| 3,004,285 A | * | 10/1961 | Hagen | 425/541 |
| 3,555,134 A | * | 1/1971 | Marcus | 264/534 |
| 3,843,286 A | * | 10/1974 | Horberg, Jr. et al. | 425/541 |
| 3,856,450 A | * | 12/1974 | Britten | 425/DIG. 5 |
| 3,912,435 A | * | 10/1975 | Waring | 425/541 |
| 4,005,966 A | * | 2/1977 | Nutting | 425/532 |
| 5,064,366 A | * | 11/1991 | Voss | 425/541 |

* cited by examiner

Primary Examiner—Robert B. Davis
(74) Attorney, Agent, or Firm—Hovey Williams LLP

(57) ABSTRACT

The upper and lower halves of a blow mold define a blow mold cavity when the halves are closed together. A bottom plug which serves to form a dome in the bottom of the blown bottle is shifted into and out of a cooperating relationship with the two mold halves by cam mechanism that operates in response to raising and lowering of the upper die set upon which the upper mold half is mounted. The actuating mechanism comprises a pair of mutually opposed cam rods having a follower trapped therebetween that is in turn coupled with the bottom plug so that as the cam rods are shifted with the upper die set, the follower reacts to cam surfaces on the rods to impart a corresponding extension and retraction motion to the bottom plug. To handle multiple, side-by-side blow mold cavities, the bottom plugs for such cavities are ganged together on a common support bar that is in turn provided with operating shanks, each provided with a cam follower operated by a cam assembly. In an alternative embodiment, the bottom plug is split into two upper and lower halves, with each half being provided with its own actuating mechanism. Sets of upper plug halves can be ganged together for actuation in unison, as can sets of lower plug halves.

31 Claims, 9 Drawing Sheets

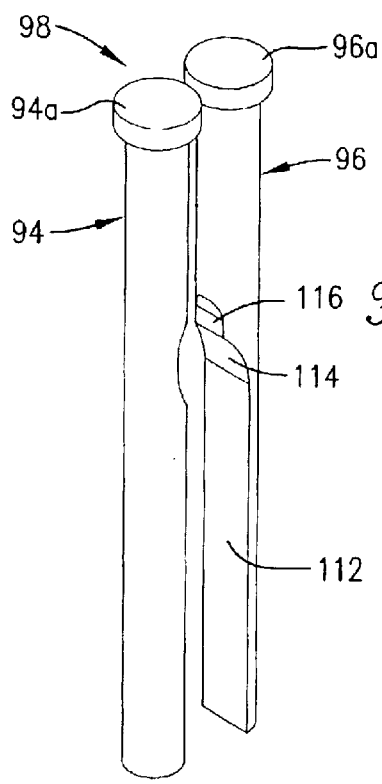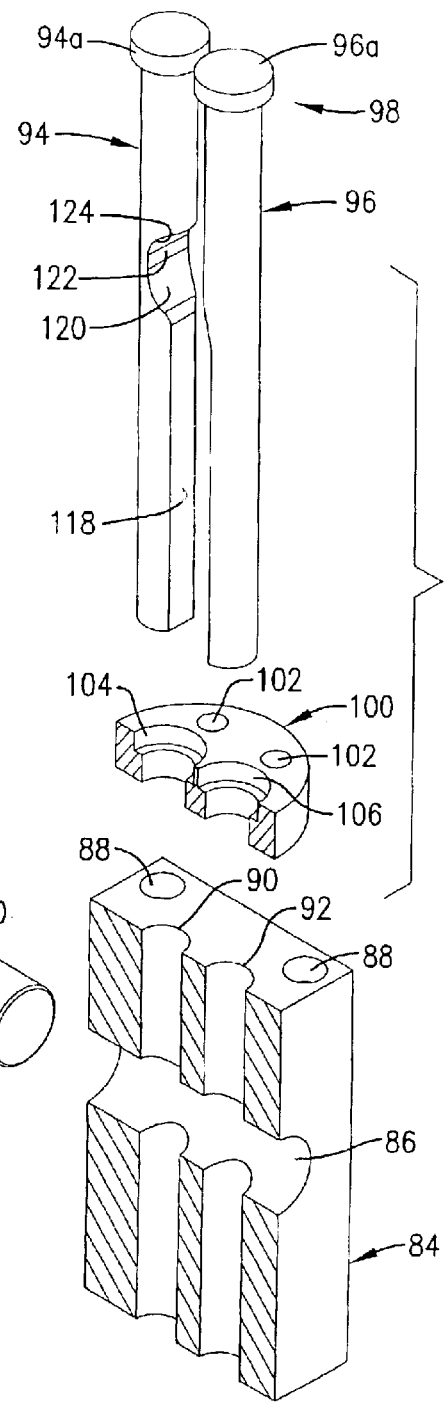
Fig. 11.
Fig. 12.

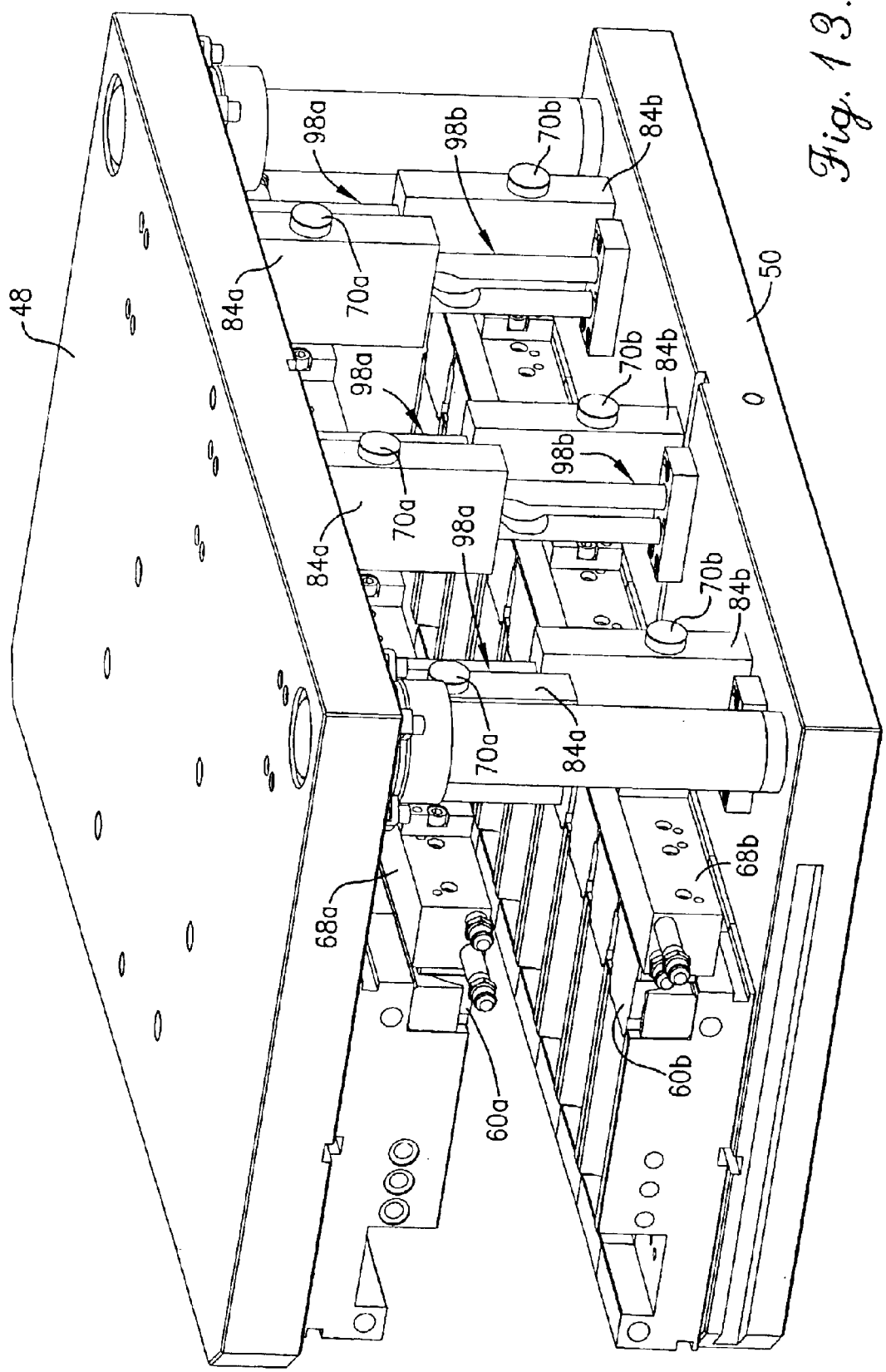

BLOW STATION BOTTOM PLUG ACTUATING MECHANISM

TECHNICAL FIELD

The present invention relates to blow molding apparatus and, more particularly, to improvements in the way bottom plugs associated with such molds are actuated between their extended and retracted positions.

BACKGROUND AND SUMMARY

Blow molded plastic bottles are typically provided with recessed, generally dome-shaped bottoms to provide increased structural integrity. To produce such a dome in the finished bottle, a corresponding "plug" or "push-up" is provided in the bottom of the blow mold cavity so that as the small parison stretches and enlarges during the blow cycle to meet the confines of the mold cavity, the bottom of the bottle partially forms around the protruding plug to conform to its shape and present the dome. However, to then facilitate discharge of the blown bottle from the machine, the bottom plug must be retracted out of the bottom of the bottle.

Typical injection blow mold machines have an upper plate-like die set that reciprocates vertically toward and away from a stationary, lower die set mounted on the machine bed. Cooperating blow mold halves are carried on the die sets to form blow mold cavities when the upper die set is in its lowered position, and to open such cavities when the upper die set is raised. A corresponding number of bottom plugs are arranged in side-by-side relationship and shifted horizontally into and out of the respective cavities for use in forming bottom domes in the blown bottles.

It is known in the art to actuate the bottom plugs using interacting cam wedges and return springs. Using this technique, a first cam wedge carried on the upper mold half comes into mating engagement with a second cam wedge carried on the bottom plug associated with the lower mold half. Thus, as the upper mold half moves downward into a closed condition with the lower mold half, the top wedge moves into engagement with the bottom wedge, camming the plug horizontally inwardly into proper position within the mold cavity. Then, as the upper mold half rises at the completion of the blow cycle, a return spring associated with the lower wedge pushes the lower wedge and associated plug back out to a retracted position so that the plug is withdrawn from the dome in the bottom of the blown bottle. Each mold cavity has its own set of cam wedges, its own set of return springs, and its own set of guide rods on which the bottom wedge reciprocates with its plug during actuation.

The conventional cam wedge actuating mechanism has many shortcomings. For one thing, the point of physical interaction and engagement between the wedge surfaces is vertically offset from the horizontal line of action of the plug itself so that the force of the interacting cam surfaces imparts a moment that tends to rock and cock the plug during actuation. This can lead to a multitude of problems, including failure of the plug to withdraw when the mold halves open because the bottom wedge is jammed on its guides and the return springs are simply incapable of providing enough force to break it loose. If a plug fails to withdraw, bottle quality can be compromised as the bottle is forced off the plug during the eject cycle.

The known cam wedge mechanism quickly becomes a problem due to premature wear of its various mechanical parts. It is important to grease the guides on which the lower cam wedge reciprocates, yet the grease has a way of working its way up into the bottle cavity areas, causing unsightly marks on the finished bottles. This can lead to rejecting entire production runs if even just a few rejects are noticed during random sampling. Furthermore, frequent tedious maintenance is required to replace prematurely worn springs, to clean the numerous components and to regrease the slide surfaces associated with the moving lower wedge.

The present invention provides a highly reliable, trouble-free actuating mechanism that supplies smooth, positive actuation of the bottom plug in both directions of actuation. No return springs of any kind are utilized. Cam surfaces interact with follower structure during both the extend and retract strokes of the bottom plug.

In one preferred embodiment, one or more cam assemblies are carried by the movable die set for reciprocation therewith during movement toward and away from the stationary die set. Each cam assembly includes an extend cam surface and a retract cam surface which are located in mutually spaced relationship on opposite sides of a follower carried by the bottom plug. Thus, as the movable mold half closes against the stationary mold half, the moving extend cam surface engages the follower and causes a reaction force transverse to the direction of die set travel which pushes the plug to its extended position within the mold cavity. Then, as the movable mold half opens at the completion of the blow cycle, the reversely moving retract cam surface engages the opposite side of the follower, causing a force in the opposite, transverse direction to withdraw the plug out to its extended position.

In a most preferred form of the invention, the mold halves open vertically and the upper die set is the part that reciprocates, the bottom plug having a horizontal stroke. Preferably, the cam surfaces are on separate cam rods operating within upright bores of a guide block that has a horizontal passage intersecting with the cam rod bores and slidably receiving an operating shank associated with the bottom plug. The shank has a slot that carries the cam follower, which is preferably in the nature of a roller, and the two cam rods are received within the slot on opposite sides of the roller to cause the shank to reciprocate horizontally within the passage as the cam rods are shifted up and down during raising and lowering of the upper die set.

In one preferred embodiment for multiple cavities, a series or gang of the bottom plugs are secured side-by-side on a common mounting bar for actuation in unison. Multiple gangs can be handled, with each gang secured to its own bar. Two or more of the operating shanks project rearwardly from each bar adjacent opposite ends thereof and are received within a pair of corresponding guide blocks mounted on the lower die set. Each guide block has its own cam rod assembly that reciprocates vertically therein during raising and lowering of the upper die set. Thus, all plugs of each gang of cavities are operated in unison for positive extension and retraction, using only a pair of cam assemblies and a pair of followers for the entire group instead of a pair of cam wedges for each cavity as in conventional constructions.

In another preferred embodiment each bottom plug is split into two halves which come together to present a complete plug when the two mold halves close. One plug half is carried on the movable die set while the other plug half remains with the stationary die set. Separate actuating mechanisms are provided for the separate plug halves, and the plug halves of each die set can be ganged together for actuation in unison.

BRIEF DESCRIPTION OF THE DRAWINGS

FIG. 11 is a isometric view of the two cam rods that comprise the major components of each cam rod assembly of the apparatus;

FIG. 12 is an exploded, fragmentary isometric view with various components shown in cross section to reveal details of construction of the apparatus; and FIG. 13 is a rear isometric view of another embodiment of the invention wherein the bottom plugs are split into two halves.

DETAILED DESCRIPTION

Prior Art

Figure 1:
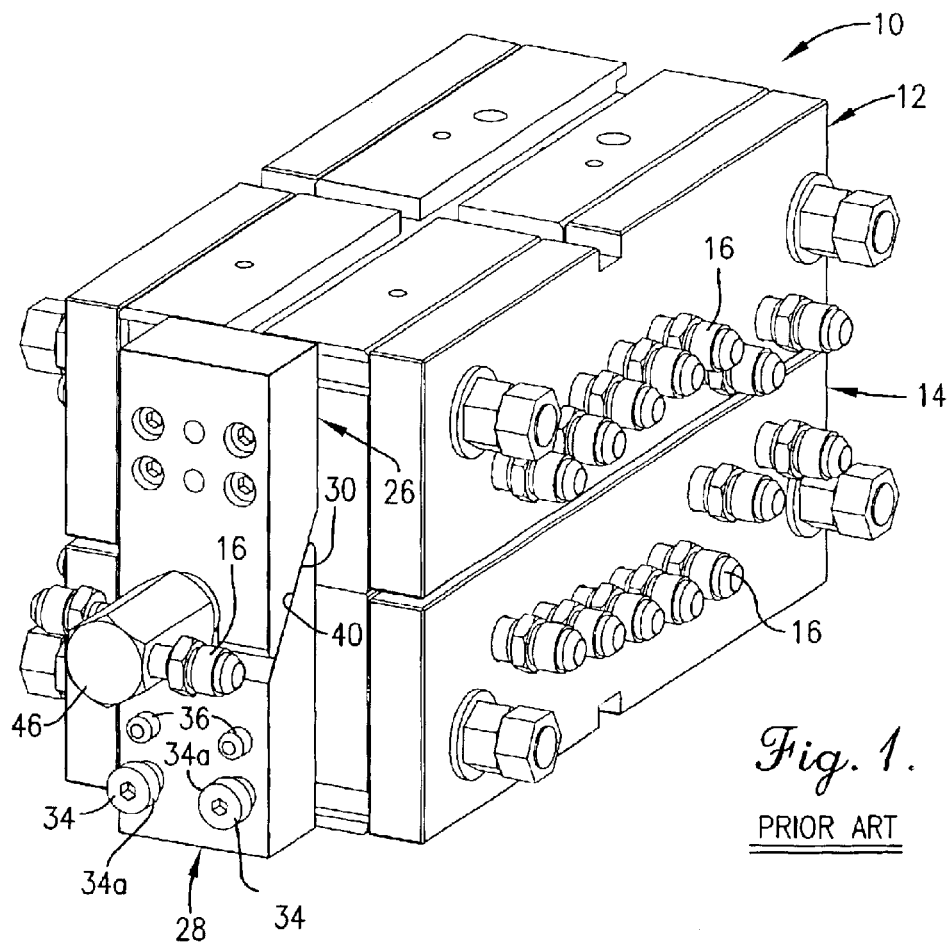
FIG. 1 is an isometric view of a prior art unit cavity blow mold employing cam wedge actuating mechanism for the bottom plug, the mold halves being shown in a closed condition.
Figure 2:
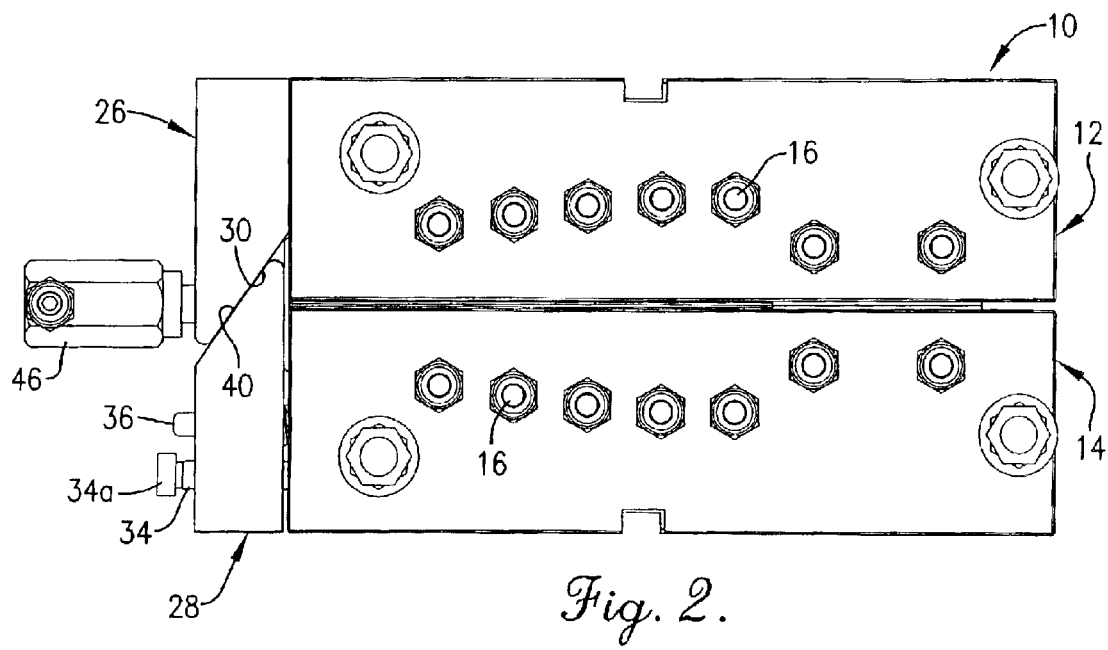
FIG. 2 is a side elevational thereof.

FIGS. 1–4 show a prior art unit cavity blow mold 10 having an upper mold half 12 and a lower mold half 14. Mold halves 12 and 14 are mounted on respective upper and lower die sets (not shown) for vertical movement of upper half 12 toward and away from lower half 14 to open and close the mold defined by halves 12, 14. A plurality of external nipples such as nipples 16 on halves 12, 14 communicate with internal cooling passages such as passages 18 in halves 12, 14 for the purpose of supplying a cooling liquid such as water to the mold.

Figure 3:
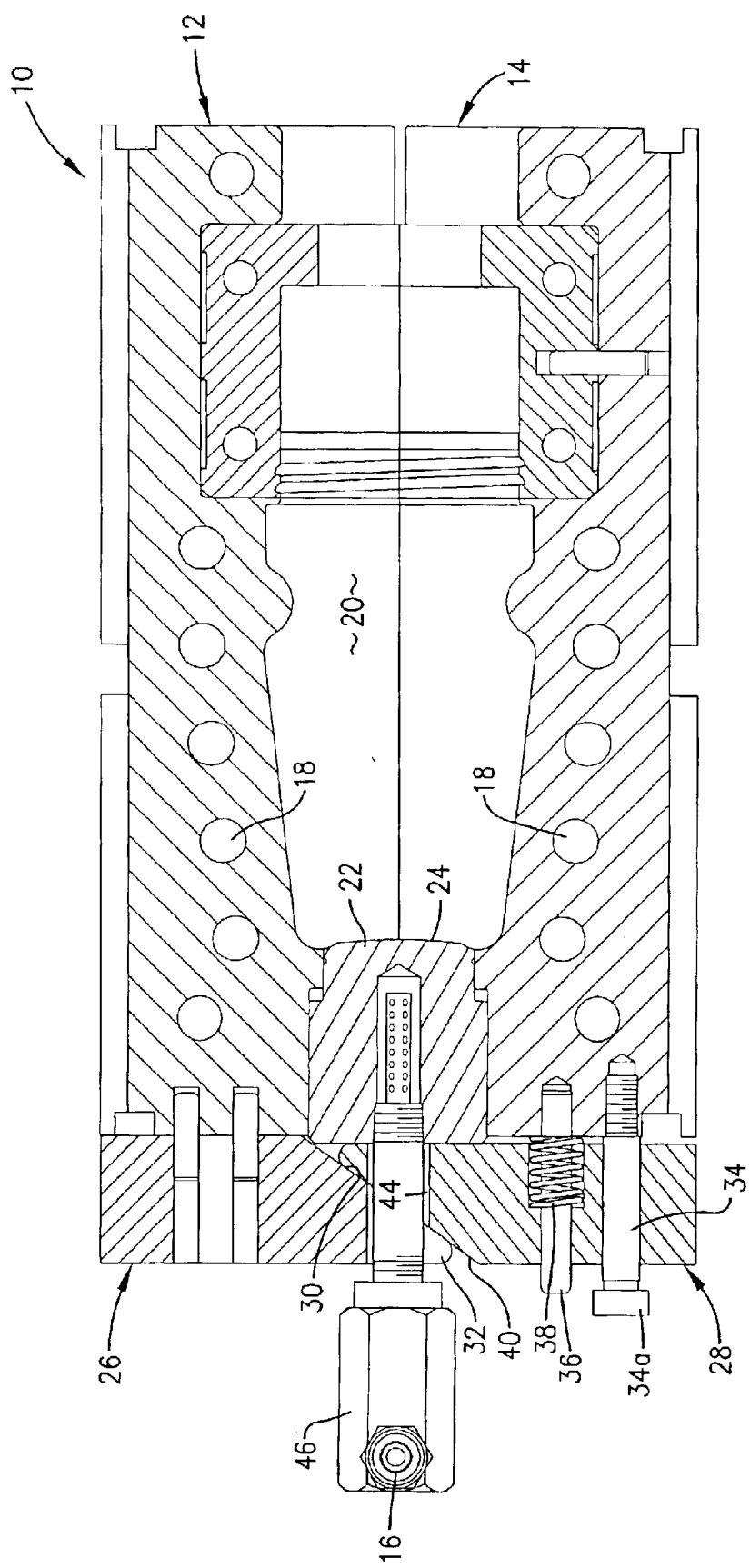
FIG. 3 is a slightly enlarged, vertical cross sectional view of the prior art unit cavity blow mold.
Figure 4:
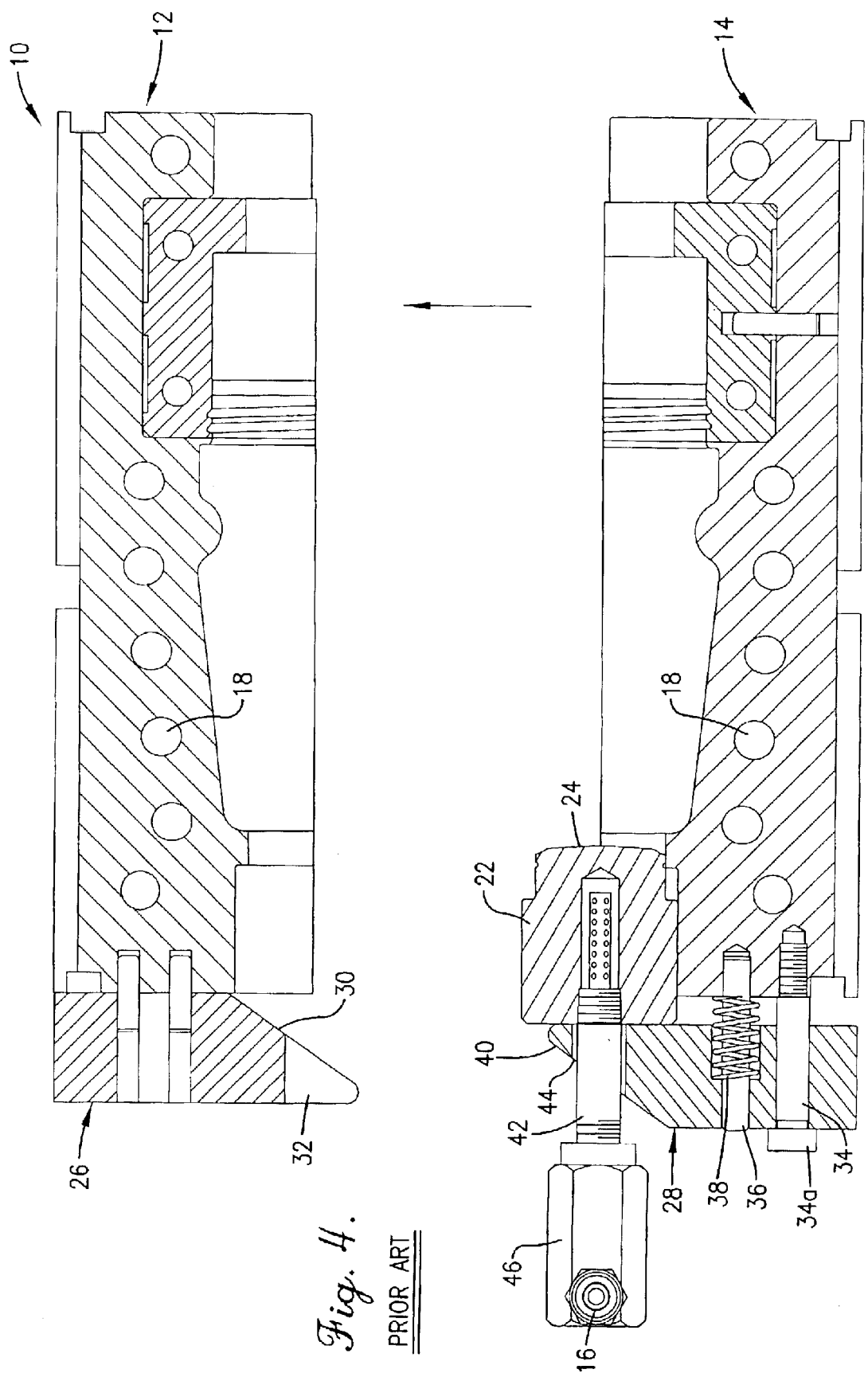
FIG. 4 is a vertical cross sectional view of the prior art unit cavity blow mold but with the mold halves in an open condition and the bottom plug in its retracted position.

When the mold halves 12, 14 come together as illustrated in FIG. 3, a blow mold cavity 20 becomes defined between halves 12 and 14 corresponding in shape and size to the final blown bottle. A major portion of the bottom of cavity 20 is defined by a cylindrical plug 22 having a convex or dome-shaped leading surface 24. Plug 22 is adapted to be actuated horizontally between an extended position in FIG. 3 and a retracted position in FIG. 4 by interacting cam wedges 26 and 28.

The upper cam wedge 26 is fixed to the outer end of upper mold half 12 for vertical reciprocation therewith and has a downwardly and inwardly facing bevel 30 at its lower extremity. Upper wedge 26 also has an inverted, generally U-shaped notch 32 in its lower extremity.

On the other hand, lower wedge 28 is affixed to plug 22 for horizontal reciprocation therewith and is guided in such movement by a pair of lower outwardly projecting guide pins 34 on lower mold half 14 and a pair of upper outwardly projecting guide pins 36 on lower mold half 14. A coiled return spring 38 surrounding each upper guide pin 36 yieldably biases lower wedge 28 and thus also plug 22 outwardly to the retracted position determined by the enlarged head 34a of each lower guide pin 34. Lower wedge 28 has an outwardly and upwardly facing bevel 40 on its upper end having the same inclination as bevel 30 of upper wedge 26. A cooling tube 42 for water or the like is threaded into the outboard end of plug 22 and projects outwardly through a hole 44 in bevel 40 to support a fitting 46 at its outer end, to which is connected one of the nipples 16.

The notch 32 in upper wedge 26 is aligned with the tube 42 associated with lower wedge 28 so that as upper half 12 moves downwardly toward lower half 14 to close mold 10, tube 14 slips into clearance notch 32. Bevels 30 and 40 come into engagement with one another, causing a horizontal reaction force directed rightwardly viewing FIGS. 4 and 3, causing plug 22 to be shifted into its extended position of FIG. 3 as mold halves 12, 14 fully close. Springs 38 become compressed at this time. As mold halves 12, 14 are then reopened, bevel 30 rises from bevel 40 and return springs 38 push lower wedge 28 leftwardly viewing FIGS. 3 and 4 to the extent permitted by heads 34a of guide rods 34. Thus, plug 22 becomes shifted outwardly to its retracted or withdrawn position.

In practice, production molds typically comprise a multiplicity of side-by-side blow mold cavities, each provided with their own pair of upper and lower mold halves and their own bottom plug. Each mold is also provided with its own pair of upper and lower cam wedges for actuating the corresponding bottom plug during raising and lower of the upper die set to which the upper mold halves are commonly attached.

A Preferred Embodiment of the Present Invention

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

FIGS. 5–12 show various aspects of one embodiment of blow mold apparatus constructed in accordance with the principles of the present invention. Although the mold halves are adapted to open vertically, and the upper mold halves are the movable ones while the lower halves are stationary, other arrangements are possible within the scope of the present invention. As illustrated in those figures, the apparatus includes an upper die set member 48 adapted to be attached to an upper platen (not shown) of a suitable injection blow molding machine, a lower die set member 50 adapted be attached to the machine bed of the machine, and a plurality of upright guide posts 52 that guide upper die set 48 during vertical reciprocation toward and away from lower die set 50. A series of blow molds comprising respective pairs of upper mold halves 54 and lower halves 56 are mounted on upper die set 48 and lower die set 50 respectively for opening and closing of the molds as illustrated in FIGS. 5, 6 and 7, 8, for example.

Each mold defines its own internal blow mold cavity 58 when mold halves 54, 56 are closed, and each mold is provided with its own bottom plug 60 that provides a closed bottom for the cavity 58. The convex or domed leading surface 62 of each plug 60 provides the desired domed or recessed bottom of the blown bottle, and each set of mold halves 54, 56 is provided with the usual type of cooling passages such as internal passages 64 shown in FIGS. 9 and 10. Such passages 64 communicate with external nipples such as nipples 66 shown in FIGS. 5–8. Although not shown in the drawings, it will be understood that plugs 60 may be provided with means for circulating cooling fluid through the interior thereof.

The foregoing components of the blow molding apparatus of FIGS. 5–12 are substantially the same as corresponding conventional components. The difference between such apparatus and the prior art resides in the manner in which bottom plugs 60 are ganged for actuation in unison, and in the particular actuating mechanism used for carrying out such actuation. In this respect, the apparatus of FIGS. 5–12 further includes a transverse mounting bar 68 that extends along behind the row of bottom plugs 60 and serves as a common mounting and support bar for all of the plugs 60 of that particular gang. Additional bottom plugs may be ganged together on additional bars as desired, to accommodate additional sets of mold cavities. In a preferred embodiment, each bar 68 is rectangular in cross sectional configuration, although this may vary, and each plug 60 is secured to the front side of bar 68 by a pair of upper and lower screws 69. Bar 68 may be provided with suitable conditioning means (not shown) for cooling or heating purposes.

In the illustrated embodiment, each mounting bar 68 has a pair of cylindrical operating shanks 70 projecting rearwardly therefrom (although more than two maybe provided) at a pair of spaced locations along its length somewhat inboard from opposite ends thereof. Each shank 70 is secured to the rear face of mounting bar 68 by a mounting plate 72. Each plate 72 traps an enlarged head 74 (see FIGS. 9 and 10) up against mounting bar 68, while the rest of shank 70 projects rearwardly through plate 72 for interaction with other structure as subsequently described. Each mounting plate 72 is releasably attached to mounting bar 68 using suitable fasteners such as screws (not shown) which may be recessed within countersunk bores 76 in plate 72 as illustrated, for example, in FIG. 12.

Figure 9:
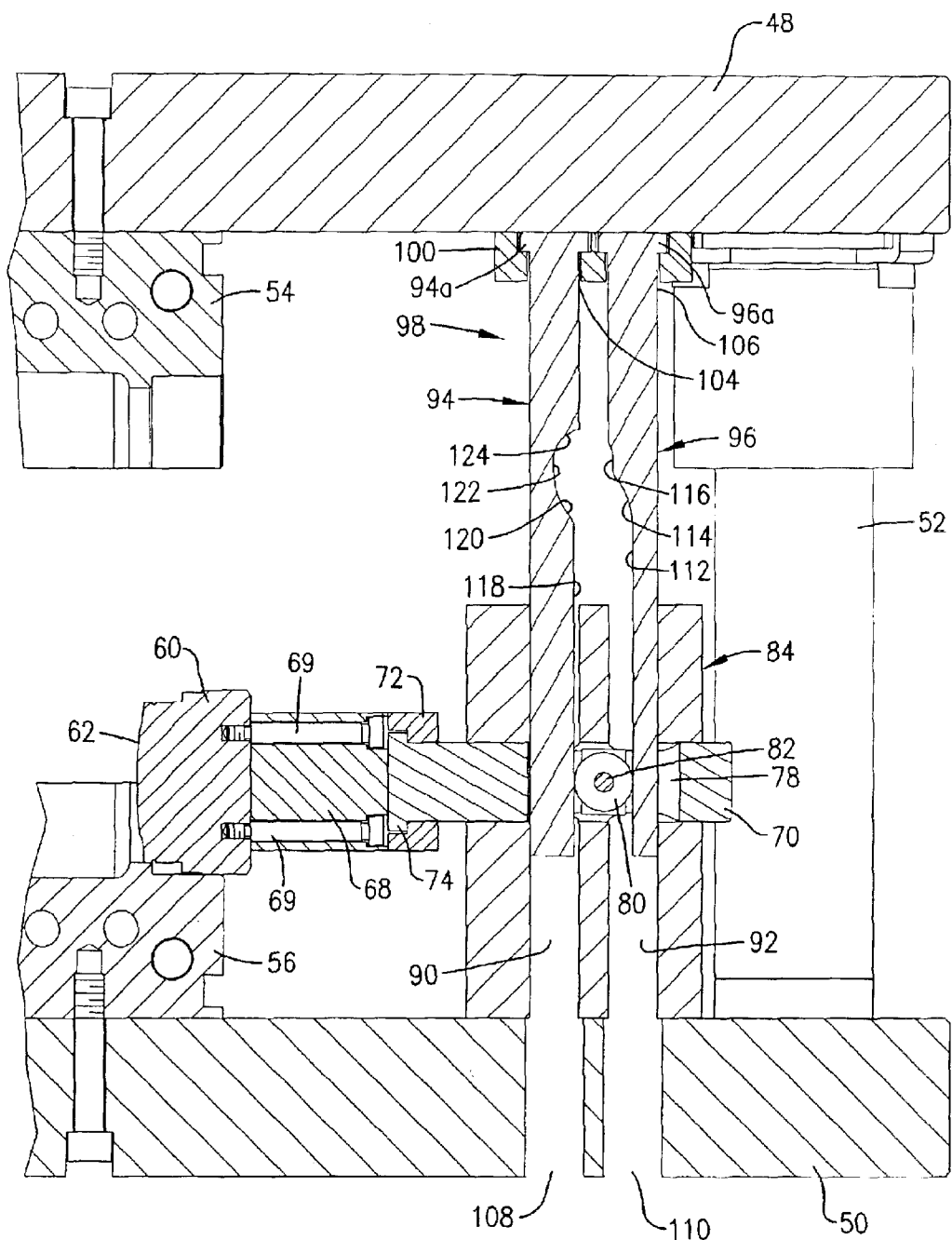
FIG. 9 is an enlarged, fragmentary vertical cross sectional view through the apparatus in an open condition revealing details of construction.
Figure 10:
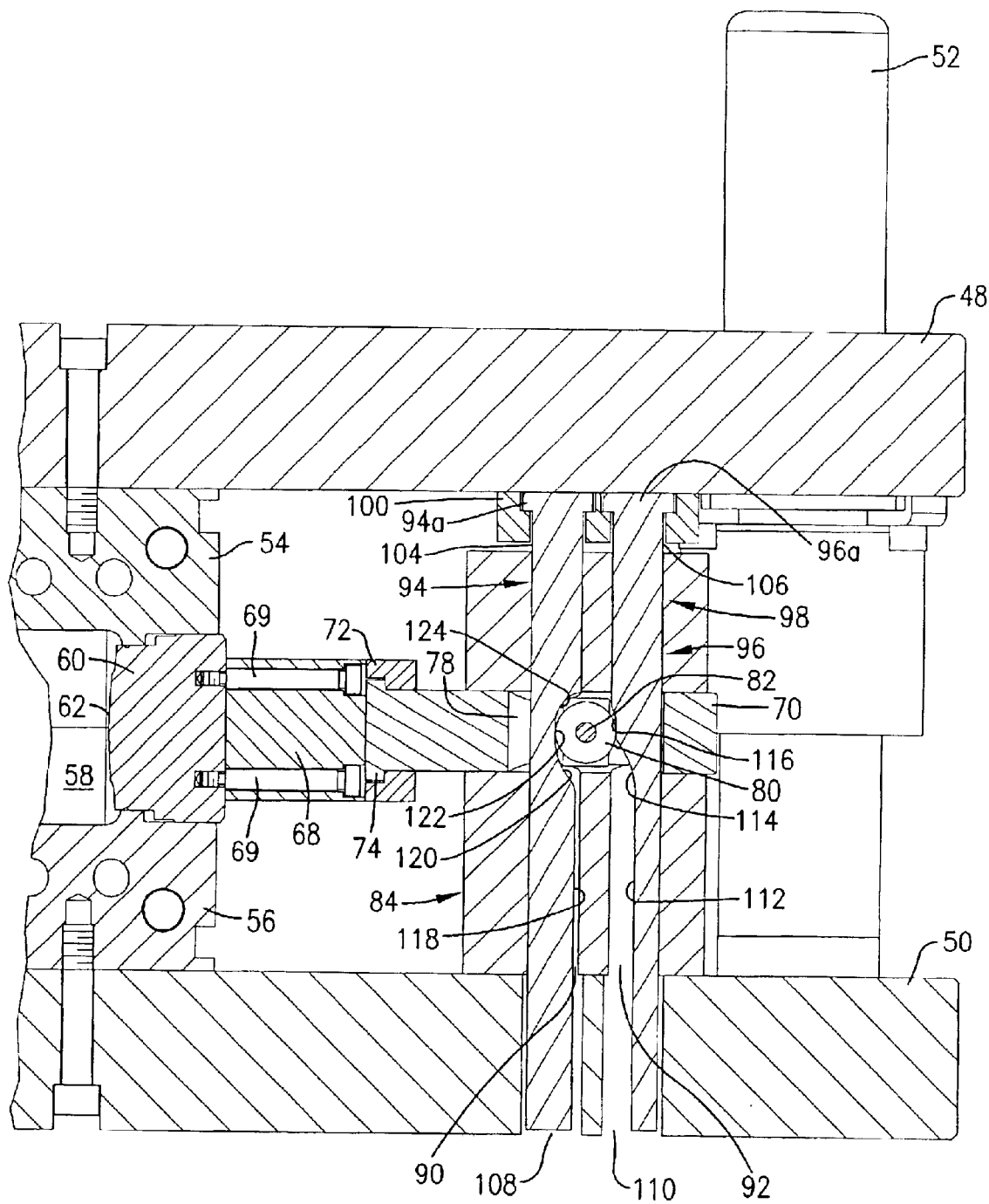
FIG. 10 is an enlarged, fragmentary vertical cross sectional view through the closed apparatus revealing details of construction.

As illustrated particularly in FIG. 12 and also in FIGS. 9 and 10, each operating shank 70 has a vertical through slot 78 intermediate its opposite ends of the shank. Within slot 78, disposed centrally thereof in a fore-and-aft direction, is cam follower structure in the nature of a roller 80 journaled for rotation on a transversely extending, horizontal cross pin 82. Slot 78 is of such length and roller 80 is of such diameter that spaces are defined on opposite sides of roller 80 between the latter and the corresponding end of slot 78. Roller 80 is slightly smaller in diameter than the diameter of shank 70 and its axis of rotation defined by cross pin 82 is located on the central axis of shank 70 so that roller 80 is symmetrical with respect to shank 70 and does not project above or below the same.

The apparatus of FIGS. 5–12 further includes a pair of upstanding guide blocks 84 that are secured to lower die set 50 at locations spaced behind mounting bar 68 in alignment with operating shanks 70. Each guide block 84 has a fore-and-aft extending, horizontal passage 86 that slidably receives the corresponding shank 70 of mounting bar 68. Shank 70 may thus slidably reciprocate within passage 86 between the two extreme positions illustrated in FIGS. 9 and 10. Each guide block 84 is secured to lower die set 50 by suitable fasteners not shown which pass through vertically extending, countersunk bores at the four corners of the block as illustrated by the two countersunk bores 88 in FIG. 12, for example.

Horizontal passage 86 within each guide block 84 intersects with a pair of vertical, fore-and-aft spaced guide bores 90 and 92. Such bores 90, 92 are, in turn, adapted to slidably receive corresponding vertically disposed, generally cylindrical cam rods 94 and 96 of a cam assembly 98 secured to and carried by upper die set 48. Thus, the cam assemblies 98 comprise another part of the blow mold apparatus of FIGS. 5–12.

The cam rods 94 and 96 of each cam assembly 98 are secured to upper die set 48 by a circular mounting plate 100 which is itself secured to die set 48 by fasteners not shown passing through bores 102 in plate 100 (FIG. 12). Each mounting plate 100 has a pair of countersunk bores 104 and 106 for receiving the corresponding cam rod 94 and 96 respectively and capturing the enlarged heads 94a and 96a thereof up against the bottom surface of upper die set 48. As shown in FIGS. 9 and 10, lower die set 50 is provided with a pair of horizontally spaced, vertical bores 108 and 110 aligned with bores 90 and 92 of each guide block 84 for the purpose of receiving and clearing the lower ends of cam rods 94 and 96 when upper die set 48 is in its lowered position as illustrated in FIG. 10.

Each cam rod 96 is an "extend" cam, while each cam rod 94 is a "retract" cam. Extend cam rod 96 is generally cylindrical, but has a forwardly facing cam surface that includes a flat, upright, follower-engaging segment 112 extending upwardly from its lowermost tip to approximately its mid-portion. At the upper termination of flat segment 112, the effective cam surface of extend cam 96 transitions to a radiused, forwardly facing, outwardly extending, concave segment 114 so that the effective working cam surface progressively moves closer to the forward extremity of cam rod 96 during this segment. At the upper extremity of concave segment 114, just before it would otherwise intersect with the forwardmost portion of the outer periphery of cam rod 96, the cam surface changes to a short, flat, upright segment 116. The horizontal, radial distance between flat segment 112 and flat segment 116 in one preferred embodiment is on the order of ten millimeters such that the effective stroke of the bottom plugs 60 from their retracted positions to their extended positions is likewise on the order of ten millimeters. Although in practice the upper flat segment 112 may be produced to have an uppermost arcuate portion, such uppermost arcuate portion is of no particular significance in the functioning of cam rod 96 and, in any event, that portion of cam rod 96 above upper flat segment 112 is cylindrical for the remaining length of rod 96 to its upper end.

Retract cam rod 94 is likewise generally cylindrical. However, this overall cylindrical configuration is deviated from over its lower portion through the presence of the rearwardly facing retract cam surface which includes a long flat, rearwardly facing, upright segment 118. Flat segment 118 corresponds in length to flat segment 112 of extend cam 96, although it is somewhat narrower than segment 112. At the upper extremity of flat segment 118, the cam surface face of retract cam 94 transitions to a rearwardly facing concave segment 120 that deepens into retract cam 94 at essentially the same radius as the concave segment 114 of extend cam 96 curves out toward the outer periphery of extend cam 96. Concave segments 114 and 120 are directly opposed to one another. At the upper and inner termination of concave segment 120, a short flat upright segment 122 commences in spaced opposition to short flat segment 116 on extend cam 96. Above short flat segment 122, a second rearwardly facing concave segment 124 curves outwardly and intersects with the rearmost periphery of retract cam 94.

In one preferred embodiment, guide blocks 84 are constructed from aluminum that is hard-anodized, while cam rods 94, 96, operating shanks 70, and follower rollers 80 are constructed from hardened steel. Mounting bar 68 and plugs 60 are constructed from a high thermoconductive material such as aluminum.

It will be appreciated that although cams 94, 96 have been disclosed as being associated with die sets 48, 50 and follower roller 80 has been disclosed as being associated with bottom plug 60, it is within the concepts of the present invention for this relationship to be reversed. It is to be understood that, in principle, cams 94, 96 could be carried by bottom plug 60 while follower roller 80 is carried by the movable one of the two die sets.

Operation

Figure 5:
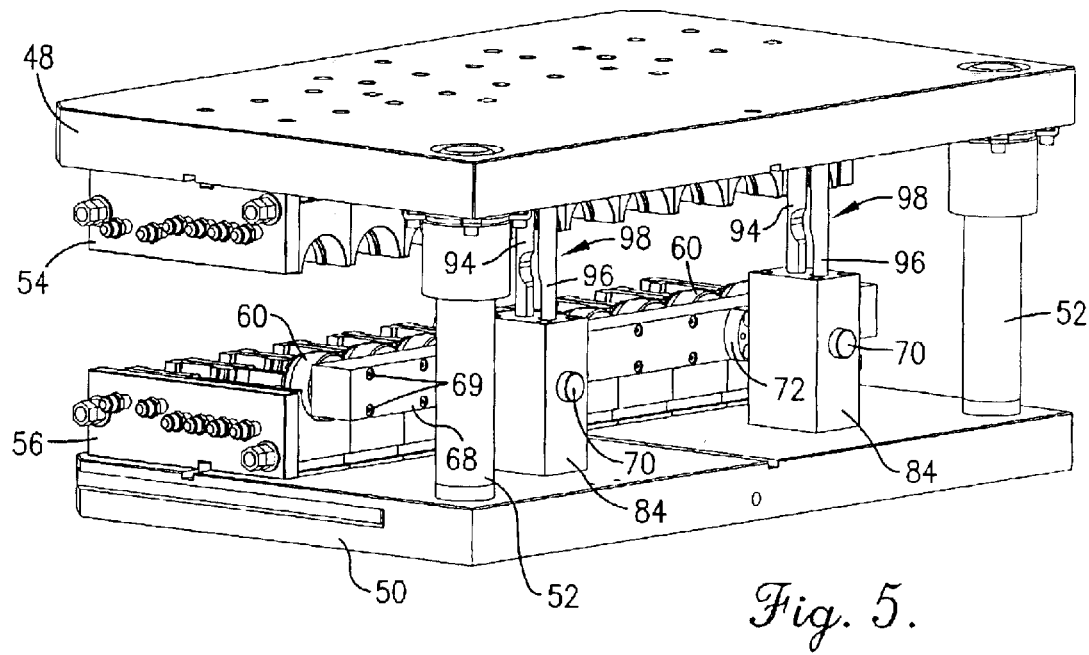
FIG. 5 is a rear isometric view of blow mold apparatus constructed in accordance with the principles of the present invention and showing the mold halves open and the bottom plugs retracted.
Figure 6:
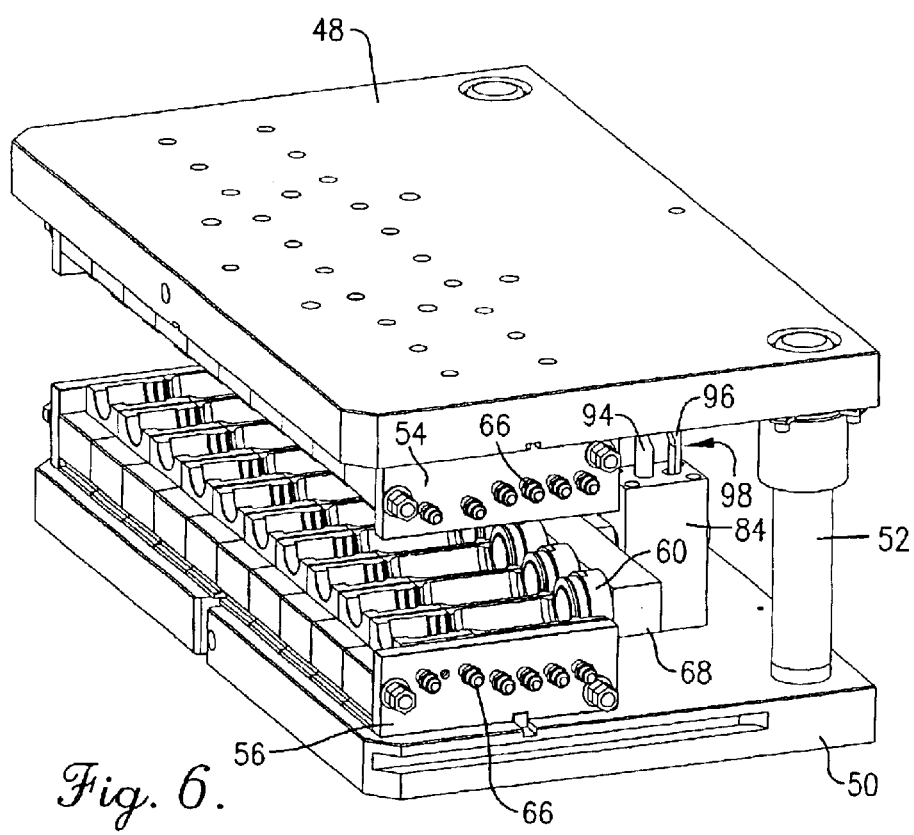
FIG. 6 is a front isometric view thereof with the mold halves open and the bottom plugs retracted.
Figure 7:
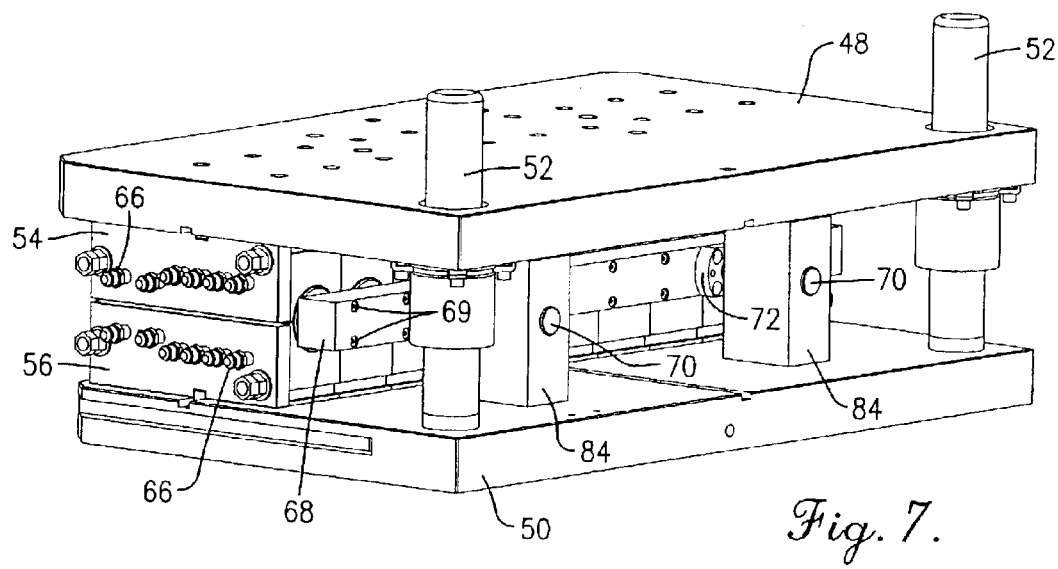
FIG. 7 is a rear isometric view of blow molding apparatus constructed in accordance with the principles of the present invention showing the mold halves closed and the bottom plugs in their extended positions.
Figure 8:
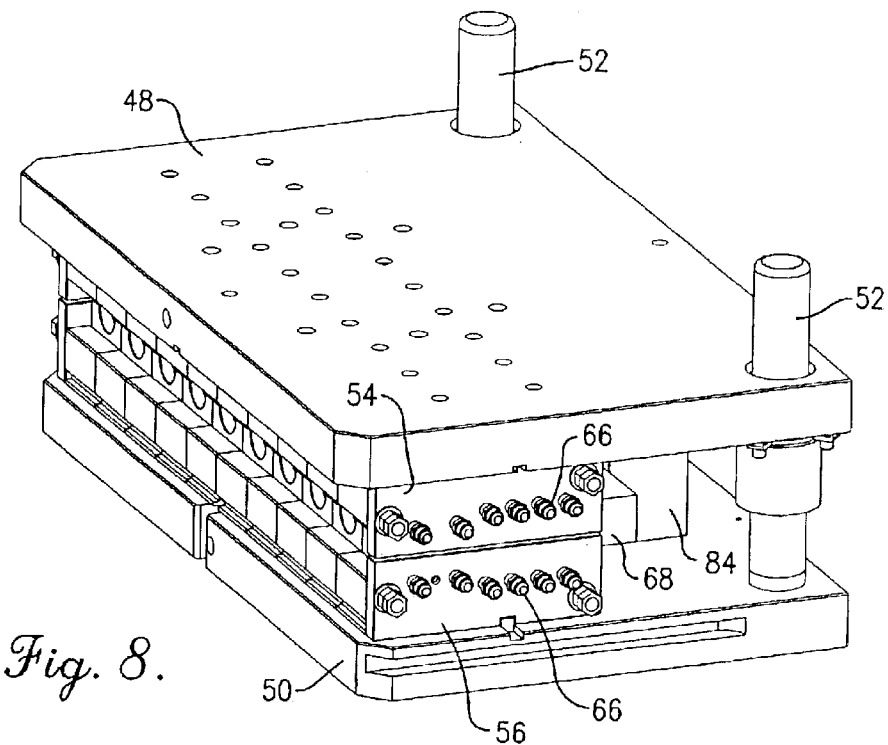
FIG. 8 is a front isometric view thereof with the mold halves closed and the bottom plugs in their extended positions.

When the upper die set 48 is in its raised position as illustrated in FIGS. 5, 6, and 9 to open the molds, plugs 60 are in their retracted positions. Cam rods 94 and 96 are fully raised such that the follower roller 80 in each guide block 84 is confined between flat segments 112 and 118 on cam rods 94 and 96.

As upper die set 48 begins to descend, upper mold halves 54 start moving toward lower mold halves 56. However, this does not initially result in movement of bottom plugs 60 because cam rods 94, 96 have no effect on followers 80 even though rods 94 and 96 are moving downwardly into guide blocks 84 at this time. Because segments 112 and 118 are upright and flat, they merely travel vertically along opposite front and rear sides of rollers 80 without imparting any horizontal movement to shanks 70.

As the upper mold halves 54 are close to closing on top of lower mold halves 56, however, concave segments 114 and 120 of cam rods 94 and 96 come into registration with follower rollers 80. Continued downward movement of upper die set 48 thus causes concave segment 114 of each extend cam rod 96 to exert a horizontal, forwardly directed force against the corresponding roller 80, resulting in shifting of all plugs 60 simultaneously toward their extended positions further into the mold halves. Such actuation is permitted at this time by virtue of the relief provided by concave segments 120 on the retract cam rods 94. By the time upper mold halves 54 have fully closed on lower mold halves 56 and cam rods 94, 96 have fully descended into blocks 84, follower rollers 80 have climbed up concave segments 114 of extend cam rods 96 and onto short flat segments 116. In this position the bottom plugs 60 are fully extended as illustrated in FIG. 10 and are retained against rearward movement out of such position by short flat segments 116. Short flat segments 122 on retract cam rods 94 preclude further inward movement of bottom plugs 60 beyond their fully extended positions at this time.

Upon completion of the blow cycle, upper die set 48 begins to lift away from lower die set 50. This immediately starts to separate upper mold halves 54 from lower mold halves 56 and also immediately starts to retract bottom plugs 60 under the positive action of retract cams 94. As cam rods 94, 96 move upwardly with upper die set 48, follower rollers 80 leave short flat segments 116 and 122 and enter the region between concave segments 114 and 120. Thus, as cam rods 94 and 96 continue upwardly, the concave segments 120 of retract cam rods 94 lift against the front sides of follower rollers 80 and exert rearwardly directed horizontal forces thereto, causing shanks 70 to slide rearwardly within their passages 86 in guide blocks 84 and retracting bottom plugs 60. By the time flat segments 112, 118 are reached by follower rollers 80, bottom plugs 60 are fully retracted, and continued upward movement of cam rods 94, 96 merely results in bottom plugs 60 holding stationary as upper mold halves 54 continue to rise with upper die set 48. When upper die set 48 is fully raised, the condition of FIG. 9 is once again established with mold halves 54, 56 fully opened and bottom plugs 60 fully retracted.

It will thus be seen that the actuating mechanism in accordance with the present invention achieves positive actuation of the bottom plugs in both directions. No springs are relied upon to return the plugs to extended positions as in conventional, prior art arrangements. Furthermore, the thrust from the vertically moving cam rods in the present invention is directly in line with the operating shanks for the bottom plugs such that no canting or cocking of the plugs occurs during their actuating movement, which results in smooth, positive travel without risk of jams and damage to the equipment. And, by mounting all of the bottom plugs on a common mounting bar, only a pair of cam assemblies are needed to actuate the entire set of plugs, instead of having a separate wedge mechanism for each plug. This greatly increases reliability and reduces the likelihood of maintenance problems and consequential downtime. Moreover, the present design can be readily retrofitted onto existing blow molding apparatus.

Alternative Embodiment

FIG. 13 shows an alternative embodiment wherein the bottom plugs are split into two upper and lower halves with one half carried by the upper die set and the other half supported on the lower die set. When the mold halves close, the plug halves also come together to present a complete plug, but each half (or series of halves) is moved through its extension and retraction strokes by its own actuating mechanism. Details of construction of each actuating mechanism remain the same as in the embodiment of FIGS. 5–12 and will not be described again at this juncture. However, due to the split nature of the bottom plugs, the actuating mechanisms are arranged differently than in the earlier embodiment, and more of such mechanisms are necessary.

Specifically, it will be seen that each plug 60 in the embodiment of FIG. 13 now comprises a top half 60a and a bottom half 60b. The top plug halves 60a are secured to a common top mounting bar 68a, while the bottom plug halves 60b are secured to a common bottom mounting bar 68b. In the illustrated embodiment, the top mounting bar 68a has three operating shanks 70a projecting rearwardly therefrom, which are identical to shanks 70, although that number may vary. Likewise, bottom mounting bar 68b has three operating shanks 70b. Top shanks 70a are reciprocably received by three top guide blocks 84a secured to and depending downwardly from upper die set 48, while bottom shanks 70b are reciprocably received by three bottom guide blocks 84b secured to and projecting upwardly from lower die set 50.

The top plug halves 60a are actuated by three bottom cam assemblies 98b that are secured to and project upwardly from lower die set 50 (only two of such assemblies 98b being visible in FIG. 3). Cam assemblies 98b are identical to cam assemblies 98 and are reciprocably received within the three corresponding top guide blocks 84a to interact with the followers (not shown, but identical to followers 80) of the corresponding top shanks 70a. Likewise, the bottom plug halves 60b are actuated by three top cam assemblies 98a that are secured to and depend downwardly from upper die set 48. Cam assemblies 98a are identical to cam assemblies 98 and are reciprocably received within the three corresponding bottom guide blocks 84b to interact with the followers of the corresponding bottom shanks 70b.

As the top mold halves 54 approach the bottom mold halves 56 and top plug halves 60a approach bottom plug halves 60b, the upper shanks 70a are actuated by the bottom cam assemblies 98b and the bottom shanks 70b are actuated by the top cam assemblies 98a. By the time mold halves 54 and 56 have completely closed, and plug halves 60a and 60b have come together, cam assemblies 98a and 98b will also have fully extended plug halves 60a and 60b into the mold. After the blow cycle, the mold halves 54, 56 and plug halves 60a, 60b start to separate, and the cam assemblies 98a, 98b withdraw plug halves 60a, 60b to their retracted positions. Upper die set 48 continues its upward movement until reaching its fully raised position of FIG. 13.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

What is claimed is:

1. In blow molding apparatus including a pair of opposed members wherein at least one of the members is movable toward and away from the other member to open and close a pair of cooperating blow mold halves carried on the members and further including a bottom plug shiftable transversely of the path of travel of the members between an extended position when the mold halves are closed in which the plug cooperates with the mold halves to form a blow cavity and a retracted position when the mold halves are open, improved actuating mechanism for the bottom plug comprising:

follower structure movable with said plug;

extend cam surface structure operatively coupled with said follower structure for shifting the plug to its extended position as the mold halves close; and retract cam surface structure operatively coupled with said follower structure for shifting the plug to its retracted position as the mold halves open, said plug including an operating shank, said shank having a slot and said follower structure being disposed within said slot, said cam surface structures being located on cams reciprocably received within said slot on opposite sides of said follower structure.

2. In blow molding apparatus as claimed in claim 1, further including a support that reciprocably receives said shank of the plug, said support having a pair of bores within which said cams reciprocate during said movement of said one member.

3. In blow molding apparatus as claimed in claim 2, said follower structure comprising a roller.

4. In blow molding apparatus as claimed in claim 1, said follower structure comprising a roller.

5. In blow molding apparatus as claimed in claim 2, said cams being on said one member, said support being on said other member.

6. In blow molding apparatus as claimed in claim 2, said support being on said one member, said cams being on said other member.

7. In blow molding apparatus including a pair of opposed members wherein at least one of the members is movable toward and away from the other member to open and close a pair of cooperating blow mold halves carried on the members and further including a bottom plug shiftable transversely of the path of travel of the members between an extended position when the mold halves are closed in which the plug cooperates with the mold halves to form a blow cavity and a retracted position when the mold halves are open, improved actuating mechanism for the bottom plug comprising:

follower structure movable with said plug;

extend cam surface structure operatively coupled with said follower structure for shifting the plug to its extended position as the mold halves close; and retract cam surface structure operatively coupled with said follower structure for shifting the plug to its retracted position as the mold halves open, said plug including a pair of plug halves, one of said plug halves being disposed for movement the said one member and the other of said plug halves being disposed to remain with said other member.

8. In blow molding apparatus as claimed in claim 7, said extend cam surface structure including a pair of extend cam surfaces, one for each of said plug halves, said retract cam surface structure including a pair of retract cam surfaces, one for each of said plug halves.

9. In blow molding apparatus as claimed in claim 8, one of said extend cam surfaces and one of said retract cam surfaces being disposed for movement with the one member for actuating said other plug half that remains with said other member, another of said extend cam surfaces and another of said retract cam surfaces being disposed to remain with said other member for actuating said one plug half that moves with said one member.

10. In blow molding apparatus as claimed in claim 9, each plug half including an operating shank, said shank having a slot, said follower structure including a follower disposed within each slot, the extend cam surface and the retract cam surface for a plug half being located on cams reciprocably received within the slot of the shank of that plug half and on opposite sides of the follower.

11. In blow molding apparatus as claimed in claim 10, each plug half being provided with a support that reciprocably receives the shank of the plug half, each support having a pair of bores within which the cams for the plug half are reciprocably received.

12. In blow molding apparatus as claimed in claim 11, said follower comprising a roller.

13. In blow molding apparatus including a pair of opposed members wherein at least one of the members is movable toward and away from the other member to open and close a pair of cooperating blow mold halves carried on the members and further including a bottom plug shiftable transversely of the path of travel of the members between an extended position when the mold halves are closed in which the plug cooperates with the mold halves to form a blow cavity and a retracted position when the mold halves are open, improved actuating mechanism for the bottom plug comprising:

follower structure movable with said plug;

extend cam surface structure operatively coupled with said follower structure for shifting the plug to its extended position as the mold halves close; and retract cam surface structure operatively coupled with said follower structure for shifting the plug to its retracted position as the mold halves open, said one member being disposed for vertical movement, said plug being disposed for horizontal shifting.

14. Blow molding apparatus comprising:

a pair of opposed members;

a series of side-by-side first blow mold halves carried by one of said members and an opposed series of side-by-side second blow mold halves carried by the other of said members, at least said one member being movable toward and away from the other member to open and close the mold halves;

a series of side-by-side bottom plugs for cooperating with the mold halves when the mold halves are closed in forming a corresponding series of side-by-side-blow cavities;

mounting structure supporting said plugs for shifting in unison in a direction transverse to the direction of movement of said one member between extended positions for forming blow cavities when the mold halves are closed and retracted positions when the mold halves are open;

followers carried by said mounting structure; and cam assemblies operably coupled with said followers for shifting the mounting structure and the plugs to said extended positions as the mold halves close and for shifting the mounting structure and the plugs to said retracted positions as the mold halves open.

15. Blow molding apparatus as claimed in claim 14, each of said cam assemblies including an extend cam surface and a retract cam surface on opposite sides of a corresponding follower.

16. Blow molding apparatus as claimed in claim 15, each of said followers comprising a roller.

17. Blow molding apparatus as claimed in claim 15, said mounting structure including a mounting member having a pair of operating shanks projecting rearwardly therefrom at spaced locations along the length thereof, further comprising a pair of guide blocks secured to said other member and reciprocably receiving respective ones of said operating shanks, said followers being mounted on respective ones of said shanks and disposed within a corresponding guide block, each cam assembly being reciprocably received within a corresponding guide block in operable interengagement with a follower.

18. Blow molding apparatus as claimed in claim 17, each shank having an operating slot, each follower being disposed within said slot, each cam assembly comprising an extend cam and a retract cam disposed within said slot on opposite sides of the follower.

19. Blow molding apparatus as claimed in claim 18, each of said followers comprising a roller.

20. Blow molding apparatus as claimed in claim 14, each of said followers comprising a roller.

21. Blow molding apparatus as claimed in claim 14, each plug including a pair of plug halves, said mounting structure including a pair of mounting members, one disposed for movement with the one member and the other disposed to remain with the other member, each mounting member supporting a series of plug halves.

22. Blow molding apparatus as claimed in claim 21, each mounting member having a pair of operating shanks projecting rearwardly therefrom at spaced locations along the length thereof, each operating shank being reciprocably received by a guide block secured to the member with which the mounting member is disposed, said followers being mounted on respective ones of said shanks and disposed within a corresponding guide block, each cam assembly being reciprocably received within a corresponding guide block in operable interengagement with a follower.

23. Blow molding apparatus as claimed in claim 22, each shank having an operating slot, each follower being disposed within said slot, each cam assembly comprising an extend cam and a retract cam disposed within said slot on opposite sides of the follower.

24. Blow molding apparatus as claimed in claim 23, each of said followers comprising a roller.

25. Mechanism for use in actuating a bottom plug of blow molding apparatus between extended and retracted positions, said mechanism comprising:

a guide block;

an operating shank reciprocably received within said block, said shank carrying a cam follower; and a cam assembly reciprocably received within said block for reciprocation along a path of travel disposed at an angle to the path of travel of the shank, said cam assembly including a pair of cam surfaces on opposite sides of said follower and configured to cause reciprocation of the shank in response to relative reciprocation between the block and the cam assembly.

26. Mechanism as claimed in claim 25, said shank having a slot, said follower being disposed within said slot, said cam surfaces reciprocating through said slot on opposite sides of the follower.

27. Mechanism as claimed in claim 26, said follower comprising a roller.

28. Mechanism as claimed in claim 26, said cam assembly including a pair of separate cam rods, said cam surfaces being on said rods.

29. Mechanism as claimed in claim 25, said cam assembly including a pair of separate cam rods, said cam surfaces being on said rods.

30. In blow molding apparatus including a pair of opposed members wherein at least one of the members is movable toward and away from the other member to open and close a pair of cooperating blow mold halves carried on the members and further including a bottom plug shiftable transversely of the path of travel of the members between an extended position when the mold halves are closed in which the plug cooperates with the mold halves to form a blow cavity and a retracted position when the mold halves are open, improved actuating mechanism for the bottom plug comprising:

follower structure;

extend cam surface structure operably coupled with said follower structure; and retract cam surface structure operably coupled with said follower structure, said follower structure and said cam surface structures coupled with said plug and said members in such a manner that the plug is shifted to its extended position as the mold halves close and to its retracted position as the mold halves open, said cam surface structures being movable with said one member, said plug being disposed on the other member, said follower structure being movable with the plug.

31. In blow molding apparatus including a pair of opposed members wherein at least one of the members is movable toward and away from the other member to open and close a pair of cooperating blow mold halves carried on the members and further including a bottom plug shiftable transversely of the path of travel of the members between an extended position when the mold halves are closed in which the plug cooperates with the mold halves to form a blow cavity and a retracted position when the mold halves are open, improved actuating mechanism for the bottom plug comprising:

follower structure;

extend cam surface structure operably coupled with said follower structure; and retract cam surface structure operably coupled with said follower structure, said follower structure and said cam surface structures being coupled with said plug and said members in such a manner that the plug is shifted to its extended position as the mold halves close and to its retracted position as the mold halves open, said plug including a pair of plug halves, one of said plug halves being disposed for movement with the one member and the other of said plug halves being disposed to remain with said other member, said follower structure including a follower movable with each plug half, said extend cam surface structure including an extend cam surface for each plug half, said retract cam surface structure including a retract cam surface for each plug half, there being an extend cam surface and a retract cam surface mounted on each of said members.

* * * * *